J. BLUE.
FERTILIZER DISTRIBUTER.
APPLICATION FILED MAY 15, 1911.
999,295.
Patented Aug. 1, 1911.
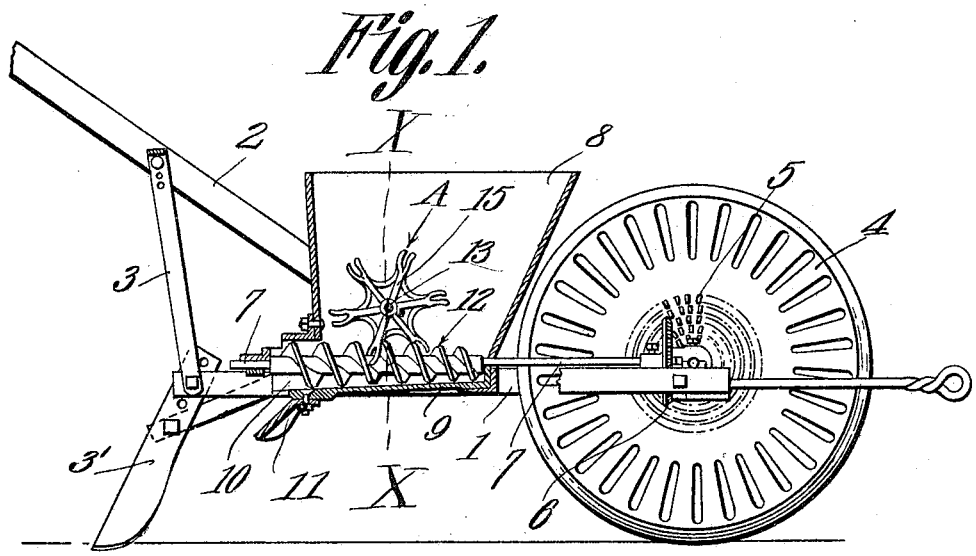
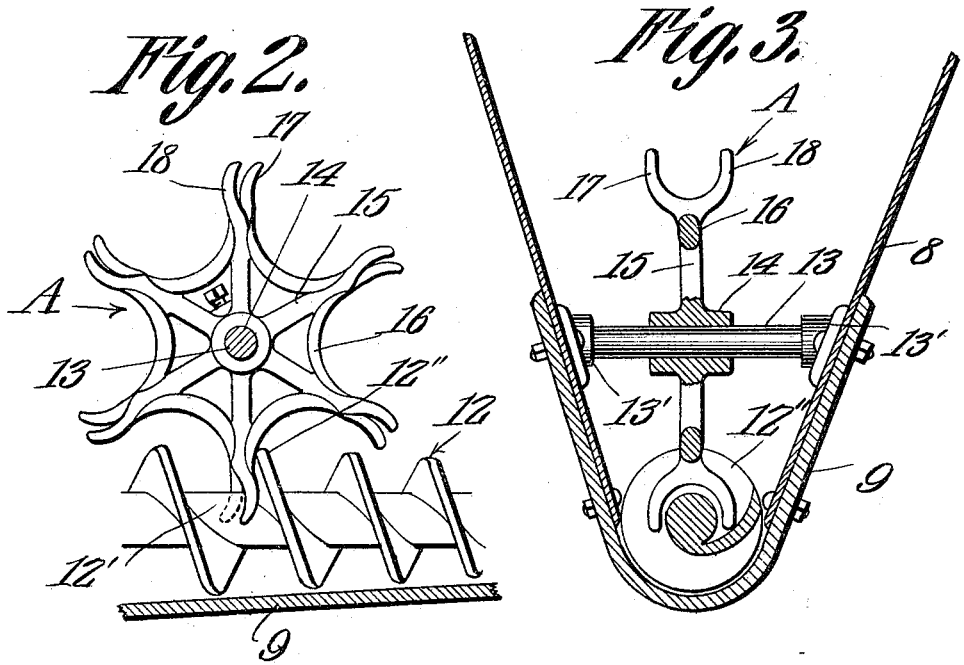
Witnesses
John Blue,
Inventor
by C. A. Snow & Co.
Attorneys.

UNITED STATES PATENT OFFICE.

JOHN BLUE, OF LAURINBURG, NORTH CAROLINA.

FERTILIZER-DISTRIBUTER.

999,295.  Specification of Letters Patent.  Patented Aug. 1, 1911.

Application filed May 15, 1911. Serial No. 627,264.

*To all whom it may concern:*

Be it known that I, JOHN BLUE, a citizen of the United States, residing at Laurinburg, in the county of Scotland and State of North Carolina, have invented a new and useful Fertilizer-Distributer, of which the following is a specification.

This invention relates to an improvement in fertilizer distributers, the primary object of the invention being the provision of an agitator disposed in the hopper and adapted to have its terminals, engaged by and in turn engage a feed-screw rotatably mounted in the bottom of the hopper in such a manner as to effectively agitate the fertilizer within the hopper, and prevent the adhesion of the same to the shaft and blades of the feed-screw.

Another object of this invention is the provision of a feed-screw and rotatable agitator operated by and co-acting therewith, said agitator having a series of radially extending arms having each two feed-screw straddling terminals, and with curved connecting portions between the arms intermediate of the terminals and hub of the agitator, whereby a forked end is provided upon each arm, and thereby provides a wider means at the terminals of each arm to agitate the fertilizer at the bottom of the hopper above the feed-screw.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 is an elevation of a fertilizer distributer constructed according to and embodying this invention, the hopper and rear portion being in longitudinal section. Fig. 2 is an enlarged detail side elevation of a portion of the hopper with the feed-screw and agitator in operable relation. Fig. 3 is a section taken on line X—X of Fig. 1.

Referring to the drawings, the numeral 1 designates the main frame of the machine, having the handle 2 and its brace 3, connected thereto. Mounted for rotation in the forward end of the frame is the earth engaging power wheel or disk 4, whose power transmitting portion 5, operates the power transmitting disk or wheel 6, mounted upon the forward end of the shaft 7, which extends rearwardly through the lower end of the fertilizer hopper 8, which is tapering in cross-section and provided with the separable bottom 9, which tapers from its forward closed end to its outlet or enlarged end 10, the distributer 11, being adjustably mounted therebelow to carry or distribute the fertilizer to the desired point to be worked in by the covering shovels 3'.

Carried upon and rotatable with the shaft 7, within the hopper 8 and its bottom 9, is a feed-screw 12, correspondingly tapered in contour to the bottom 9, and having the cylindrical portions 12' and the spiral rim or flange 12", thus providing a means to receive the fertilizer between the convolutions of the rim, and by the rotation of the feed-screw, to feed the fertilizer rearwardly and out of the outlet 10 of the hopper.

As is often the case, the fertilizer will cake, and therefore will not be properly fed out of the hopper, and to properly agitate the fertilizer, and prevent its caking within the hopper, and even its adherence to the feed-screw, the agitator A, is provided, said agitator being mounted vertically and longitudinally within the hopper 8, above the feed-screw, and toward the outlet end thereof. This agitator is carried by and rotatable with the shaft 13, mounted in the trunnions 13', secured to the sides of the hopper, and forming closed journals for the ends of the shaft 13. The hub 14, of the agitator is keyed to the shaft 13, and is provided with the radial arms 15, connected together by the inwardly curved strips 16, the said arms 15, each terminating beyond the strips 16, in the forked end, or two members 17 and 18, said members being curved or bent one slightly in the rear of the other, as shown Figs. 1 and 2, and thereby conforming to the curvature of the rim or flange 12", when the forked end is in engagement with said rim 12" and straddles the cylindrical portion 12', of the feed-screw between the portions of the rim, as clearly shown in Figs. 2 and 3. By this means, it will be seen that as the feed-screw 12 is rotated, that the successive forked ends 17 and 18, of the radial arms of the agitator, will be brought into the path of the convolute flange 12" of the feed-screw, and the rubbing action thereof against the rear surfaces of the members 17 and 18, will impart to the entire agitator a rotation in the direction of the arrow, Fig 2; and that the series of forks of the agitator will be rotated, and thereby agitate the fertilizer within the hopper, and cause the same to at all times be in condition to be properly fed by the feed-screw through the outlet 10, to be distributed by the distributer 11.

The members 17 and 18, as shown, are bent or curved to conform to the shape of both the cylindrical portion 12' and the face of the convolute flange 12", thus insuring the proper movement of the agitator toward the front of the machine, and within the hopper, and thereby insuring an even agitation of the fertilizer within the hopper and feeding through the outlet 10.

As shown in Fig. 2, the forward portion of the member 17 and the rear portion of the member 18, are approximately the same distance from a radial line drawn from the axis of the agitator through the center of the member's arm 15, this being desirable to accomplish the result.

What is claimed, is:—

1. A fertilizer distributer, having a rotatable feed-screw, and an agitator having a series of forked ends radially disposed and adapted to engage the said feed-screw so that the said feed screw will actuate the agitator.

2. A fertilizer distributer, having a hopper with an outlet, a feed-screw rotatably mounted in the lower end thereof to feed the fertilizer through the outlet, and an agitator rotatably mounted in the hopper above the feed-screw and provided with radially disposed arms terminating in a fork, said fork of each arm being adapted to engage the feed-screw and be rotated thereby.

3. A fertilizer distributer, having a hopper, a feed-screw extending from the forward end of the bottom of the hopper and beyond the rear end thereof, and an agitator rotatably mounted within the hopper above the feed-screw, said agitator having a series of connected radially disposed arms with forked terminals, said forked terminals being in the path of and in operable engagement with the feed-screw.

4. A fertilizer distributer, having a hopper, a feed-screw extending longitudinally of the bottom of the hopper, and an agitator mounted for rotation within the hopper, said agitator comprising a series of radially disposed arms, equi-distant apart and provided with forked terminals, said forked terminals being in the path of the feed-screw.

5. A fertilizer distributer, having a hopper, a feed-screw having a convolute flange mounted within the bottom of the hopper, and an agitator rotatably mounted within the hopper above the feed-screw, said agitator having a series of radially disposed arms carrying forks, the members of which extend transversely of the hopper and in the path of feed-screw, said forks being adapted to engage the convolute flange of the feed-screw and form a means to scrape the flange and to receive motion from the feed-screw.

6. A fertilizer distributer, having a hopper, said hopper having a tapered bottom of reduced transverse area, a feed-screw rotatably mounted for longitudinal feeding in said reduced portion of the hopper, and an agitator rotatably mounted in the hopper above the feed-screw and having a series of radially disposed arms, each of which terminates in forked terminals, the extension of the forks being transversely of the hopper and adapted to travel in the path of and be engaged by the feed-screw.

7. A fertilizer distributer, having a hopper, a feed-screw having a convoluted flange and intervening cylindrical portions and rotatably mounted in said hopper, and an agitator having a series of radially disposed arms, inwardly curved strips connecting the arms intermediate of their ends, and two curved members at the extreme ends of each arm forming a fork, the said members of each fork having their terminals bent out of line in opposite directions from the center radial line of its respective arm.

In testimony that I claim the foregoing as my own, I have hereto affixed my signature in the presence of two witnesses.

his
   JOHN × BLUE.
      mark

Witnesses:
 FRANK B. OCHSENREITER,
 C. E. DOYLE.